United States Patent
Gao et al.

(10) Patent No.: US 11,177,863 B2
(45) Date of Patent: Nov. 16, 2021

(54) MASSIVE MIMO ROBUST PRECODING TRANSMISSION METHOD

(71) Applicant: SOUTHEAST UNIVERSITY, Nanjing (CN)

(72) Inventors: Xiqi Gao, Nanjing (CN); Anan Lu, Nanjing (CN); Wen Zhong, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 69 days.

(21) Appl. No.: 16/643,560

(22) PCT Filed: Oct. 16, 2017

(86) PCT No.: PCT/CN2017/106351
§ 371 (c)(1),
(2) Date: Feb. 29, 2020

(87) PCT Pub. No.: WO2019/041470
PCT Pub. Date: Mar. 7, 2019

(65) Prior Publication Data
US 2020/0204226 A1 Jun. 25, 2020

(30) Foreign Application Priority Data
Aug. 31, 2017 (CN) .......................... 201710766951.3

(51) Int. Cl.
*H04B 1/04* (2006.01)
*H04B 7/0456* (2017.01)
*H04B 7/0417* (2017.01)

(52) U.S. Cl.
CPC ......... *H04B 7/0456* (2013.01); *H04B 7/0417* (2013.01)

(58) Field of Classification Search
CPC ............................ H04B 7/0456; H04B 7/0417
USPC ........................................................ 375/267
See application file for complete search history.

(56) References Cited

U.S. PATENT DOCUMENTS

| | | | |
|---|---|---|---|
| 2008/0310523 A1 | 12/2008 | Hui et al. | |
| 2013/0235807 A1* | 9/2013 | Lee ......................... | H01Q 1/246 370/329 |
| 2018/0048361 A1* | 2/2018 | Kundargi ............ | H04L 25/0224 |
| 2018/0234268 A1* | 8/2018 | Bazzi ................... | H04L 25/021 |

(Continued)

FOREIGN PATENT DOCUMENTS

| | | |
|---|---|---|
| CN | 104702543 A | 6/2015 |
| CN | 105897627 A | 8/2016 |
| CN | 106130697 A | 11/2016 |

*Primary Examiner* — Kevin M Burd
(74) *Attorney, Agent, or Firm* — Bayramoglu Law Offices LLC

(57) ABSTRACT

A massive multiple-input multiple-output (MIMO) robust precoding transmission method under imperfect channel state information (CSI), wherein the imperfect CSI obtained by the base station (BS) side of the massive MIMO system is modeled as an a posteriori statistical channel model including channel mean and channel variance information. The model considers the effects of channel estimation error, channel aging and spatial correlation. The BS performs the robust precoding transmission by using the a posteriori statistical channel model, so that the universality problem of the massive MIMO to various typical moving scenarios can be solved, and high spectral efficiency is achieved.

13 Claims, 8 Drawing Sheets

```
┌─────────────────────────────────────────────┐
│ A BS acquires a priori joint correlation    │
│ channel model of each user channel through  │
│ uplink channel sounding                     │
└─────────────────────────────────────────────┘
                       │
                       ▼
┌─────────────────────────────────────────────┐
│ The BS acquires a posteriori joint          │
│ correlation channel model, including a      │
│ channel mean and variance information, of   │
│ each user channel through channel           │
│ estimation and prediction by using an       │
│ uplink pilot signal and the priori joint    │
│ correlation channel model                   │
└─────────────────────────────────────────────┘
                       │
                       ▼
┌─────────────────────────────────────────────┐
│ The BS performs the robust precoding        │
│ transmission by using the posteriori joint  │
│ correlation channel models including the    │
│ channel means and the variance information  │
└─────────────────────────────────────────────┘
```

(56) References Cited

U.S. PATENT DOCUMENTS

2018/0309549 A1* 10/2018 Papadopoulos ....... H04L 5/0048
2021/0002743 A1* 1/2021 Matsunaga ............... C22F 1/08

* cited by examiner

MASSIVE MIMO ROBUST PRECODING TRANSMISSION METHOD

CROSS REFERENCE TO THE RELATED APPLICATIONS

This application is the national phase entry of International Application No. PCT/CN2017/106351, filed on Oct. 16, 2017, which is based upon and claims priority to Chinese Patent Application No. 201710766951.3, filed on Aug. 31, 2017, the entire contents of which are incorporated herein by reference.

TECHNICAL FIELD

The present invention belongs to the technical field of communications, and relates to massive multiple-input multiple-output (MIMO) robust precoding transmission method.

BACKGROUND

In order to improve the user experience and address the challenges posed by the rapid growth of wireless data service and the requirements of new services, the next-generation mobile networks need to support high quality, high transmission rate, high mobility, high user density, low latency, and other scenarios. By equipping a large-scale antenna array on a base station (BS), massive multiple-input multiple-output (MIMO) greatly increases the system capacity, and is one of the key technologies for the next-generation wireless networks. It has been also a hot research topic in recent years.

A massive MIMO precoding transmission method is related to whether the potential performance gain provided by massive MIMO can be achieved. Precoders can be divided into linear precoders and non-linear precoders. The non-linear precoders can achieve near-optimal performance, but their complexity is too high. Currently, most works in the massive MIMO literature focus on the linear precoders, and most of them are linear precoders for single-antenna users. For a massive MIMO downlink with single antenna users, the linear precoder can achieve the near-optimal performance when the number of transmit antennas is much greater than the number of receive antennas. The linear precoders commonly used in the literature includes the match filter (MF) precoder and the regularized zero forcing (RZF) precoder.

Multi-antenna equipment has been adopted by user terminals in mobile communication systems at present. In next-generation wireless networks, multi-antenna users will inevitably continue to exist. Therefore, researches on massive MIMO precoder designs for the multi-antenna users cannot be avoided. The complexity of non-linear precoders is extremely high, and currently cannot be applied to the massive MIMO. Meanwhile, simple linear precoders, such as the MF precoder and the RZF precoder, cannot achieve the near-optimal performance when the number of transmitting antennas at the BS is limited. To achieve the near-optimal performance, linear precoders obtained by maximizing weighted sum-rate needs to be considered. The precoder design depends on channel state information (CSI) that can be acquired by the BS. When the BS has the perfect CSI, an iterative weighted minimum mean square error (WMMSE) precoding method widely used in a traditional multi-user MIMO system can be directly extended to the massive MIMO system. The method can converge to a local optimal solution for the maximum weighted sum-rate optimization problems. When the BS has statistical CSI, there are beam division multiple access (BDMA) transmission methods and joint spatial division and multiplexing (JSDM) transmission methods in the literature. Specifically, both the methods work when the statistical CSI has a zero mean.

In practical massive MIMO systems, perfect CSI at the BS are usually not available due to channel estimation errors, channel aging and other factors. Therefore, the iterative WMMSE algorithm based on the perfect CSI cannot be used in practical systems. To meet the needs that the users in practical systems are possibly in different moving speeds, user channel information obtained by the BS needs to be modeled as a jointly correlated model with a known channel mean and variance. Since the CSI obtained by the BS has both channel mean and channel variance information, neither the BDMA transmission method nor the JSDM method can be applied.

SUMMARY

For the deficiencies in the prior art, the present invention discloses a massive multiple-input multiple-output (MIMO) robust precoding transmission method, which can solve the applicability problem of a massive MIMO technology under various typical scenarios.

In order to achieve the above objective, the present invention provides the following technical solution.

Compared with the prior art, the present invention has the following advantages and beneficial effects.

A massive multiple-input multiple-output (MIMO) robust precoding transmission method under imperfect channel state information (CSI), comprising: By using the pilot signals and a priori statistical channel models, a base station (BS) or transmitting apparatus acquires a posteriori statistical channel models of the mobile terminals or receiving apparatuses, which include channel mean or expected value and channel variance information; and the BS or transmitting apparatus performs robust precoding transmission, by using the a posteriori statistical channel models including the channel mean or expected value and the channel variance information.

As an improvement of the present invention, the a priori statistical correlation channel model is acquired through the following step:

the BS or transmitting apparatus acquires the a priori statistical correlation channel model through uplink channel sounding;

or, the mobile terminal or receiving apparatus acquires the a priori statistical correlation channel model through downlink channel sounding.

As an improvement of the present invention, the a priori statistical correlation channel model uses one of the following models: a jointly correlated channel model, a separately correlated channel model and a fully correlated channel model.

As an improvement of the present invention, the a posteriori statistical channel model is acquired through the following step:

the BS or transmitting apparatus acquires channel information through channel estimation and prediction by using an uplink pilot signal and the a priori jointly correlated channel model;

or the mobile terminal or receiving apparatus acquires channel information based on channel estimation, prediction and feedback by using a downlink pilot signal and the a priori jointly correlated channel model.

As an improvement of the present invention, the channel mean or expected value and the channel variance information in the a posteriori statistical channel model include posterior channel mean or expected value and posterior channel variance information.

As an improvement of the present invention, the posterior channel mean or expected value and the posterior channel variance information comprise:

Conditional mean or expected value and conditional variance information of the channels under the condition of the BS or transmitting apparatus receiving uplink pilot signals; or Conditional mean or expected value and conditional variance information of the channels under the condition of mobile terminals or receiving apparatuses receiving downlink pilot signals.

As an improvement of the present invention, the a posteriori statistical channel model is the one that involves channel estimation errors, channel aging and the influence of space correlation.

As an improvement of the present invention, the a posteriori statistical channel model uses one of the following models: a jointly correlated channel model, a separately correlated model and a fully correlated model.

As an improvement of the present invention, in the robust precoding transmission, the BS or transmitting apparatus performs linear precoding matrix design of each mobile terminal or receiving apparatus according to the weighted ergodic sum-rate maximization criterion, and the weighted ergodic sum-rate is the conditional mean of the weighted sum-rate calculated according to the established a posteriori statistical channel model.

As an improvement of the present invention, in the robust precoding transmission, when the BS or transmitting apparatus performs the linear precoder design of each mobile terminal or receiving apparatus according to the weighted ergodic sum-rate maximization criterion, solving the weighted ergodic sum-rate maximization problem is converted into iterative solving of a quadratic optimization problem through an MM algorithm.

As an improvement of the present invention, expectations of certain matrices required by solving the quadratic optimization problem are fast calculated by using their deterministic equivalents.

A channel acquisition method with pilot reuse for massive MIMO robust precoding transmission under imperfect CSI, comprising: a base station (BS) or transmitting apparatus— acquires a posteriori statistical channel models of the mobile terminals or receiving apparatuses, which includes channel mean or expected value and channel variance information; and the BS or transmitting apparatus performs robust precoding transmission by using the a posteriori statistical channel model including the channel mean or expected value and the channel variance information; In the robust precoding transmission, the downlink acquires channel information with pilot reuse in the precoding domain: the BS or transmitting apparatus transmits a downlink pilot signal to each mobile terminal or receiving apparatus in the precoding domain, the mobile terminal or receiving apparatus performs channel estimation of the equivalent channel in the precoding domain by using the received pilot signal, and the equivalent channel in the precoding domain is the original channel multiplied by the robust precoding matrix.

As an improvement of the present invention, the precoding domain pilot signal transmitted by the BS or the transmitting apparatus to each mobile terminal or receiving apparatus is transmitted on the same time-frequency resource, and the pilot signals of all mobile terminals or receiving apparatuses are not required to be orthogonal.

As an improvement of the present invention, the pilot signal in the precoding domain transmitted by the BS or transmitting apparatus to each mobile terminal or receiving apparatus is a frequency domain signal generated by modulating a ZC sequence or a group of ZC sequences.

A receiving method of massive multiple-input multiple-output (MIMO) robust precoding transmission, comprising: a mobile terminal or receiving apparatus receives a transmitted signal subjected to robust precoding transmission after it passes through a transmission channel, and the mobile terminal or receiving apparatus perform receive signal processing by using the received transmit signal.

As an improvement of the present invention, the received transmit signal comprises a downlink omnidirectional pilot signal, and/or a pilot signal in the robust precoding domain, and/or a data signal in the robust precoding domain.

As an improvement of the present invention, the pilot signal is a frequency domain signal generated by modulating a ZC sequence or a group of ZC sequences.

As an improvement of the present invention, in the received signal processing, the mobile terminal or receiving apparatus performs channel estimation, prediction and feedback by using the received downlink omnidirectional pilot signal.

As an improvement of the present invention, in the received signal processing, the mobile terminal or receiving apparatus performs channel estimation of the equivalent channel in the precoding domain by using the received pilot signal in the robust precoding domain.

As an improvement of the present invention, in the received signal processing, the mobile terminal or receiving apparatus performs demodulation or detection of the signal in the precoding domain by using the received data signal in the precoding domain.

The massive MIMO robust transmission method provided by the present invention can solve the universality problem of massive MIMO to various typical moving scenarios, and achieve high spectral efficiency. The present invention performs robust precoding transmission by using the a posteriori statistical channel model including the channel mean and the channel variance information, and the used statistical channel model is more sufficient and accurate. Reduced dimension transmission can be realized through the robust precoding method, so that the pilot expenses required by data transmission can be reduced, the complexity of demodulation or detection is lowered, and the overall efficiency of transmission is improved.

DETAILED DESCRIPTION OF THE EMBODIMENTS

The technical solutions provided in the present invention will be described in detail below with reference to specific embodiments. It should be understood that the following specific embodiments are only used for illustrating the present invention and not intended to limit the scope of the present invention.

Figure 1:
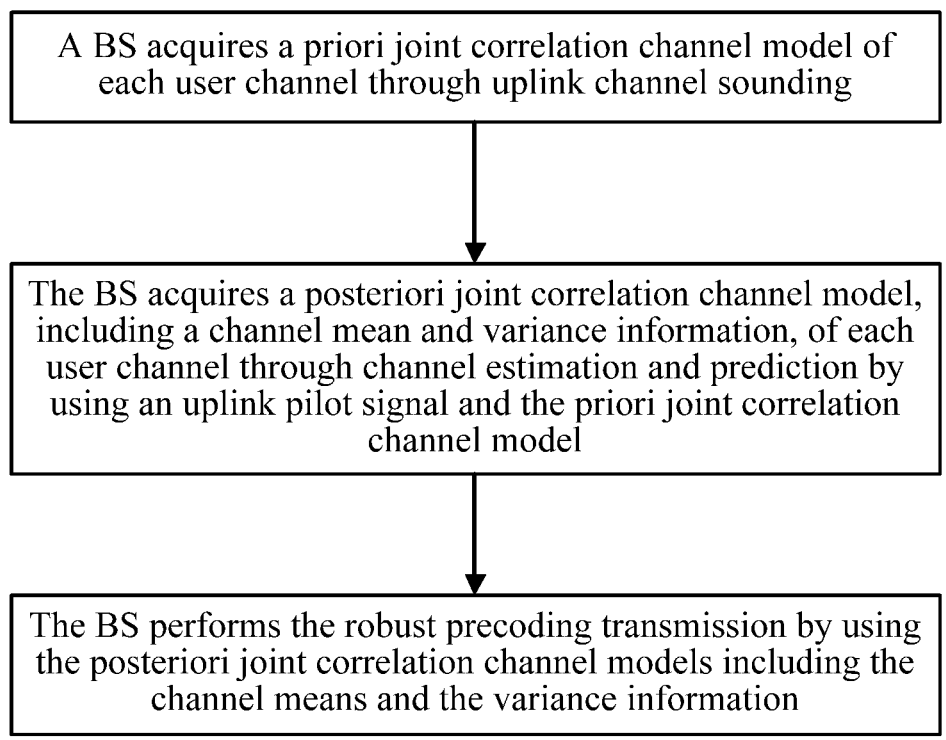
FIG. 1 is a flow diagram of a massive multiple-input multiple-output (MIMO) downlink robust precoding transmission method.

As shown in FIG. 1, a massive multiple-input multiple-output (MIMO) downlink robust precoding transmission method disclosed in an embodiment of the present invention includes that: a base station (BS) acquires an a priori jointly correlated channel model of each user through uplink channel sounding; the BS acquires an a posteriori jointly correlated channel model, including channel mean and channel variance information, of each user through channel estimation and prediction by using an uplink pilot signal and the a priori jointly correlated channel model; and the BS performs robust precoding transmission by using the a posteriori jointly correlated channel model including the channel mean and the channel variance information. The BS in the present invention may also use other transmitting apparatuses capable of sending/transmitting information.

Figure 2:
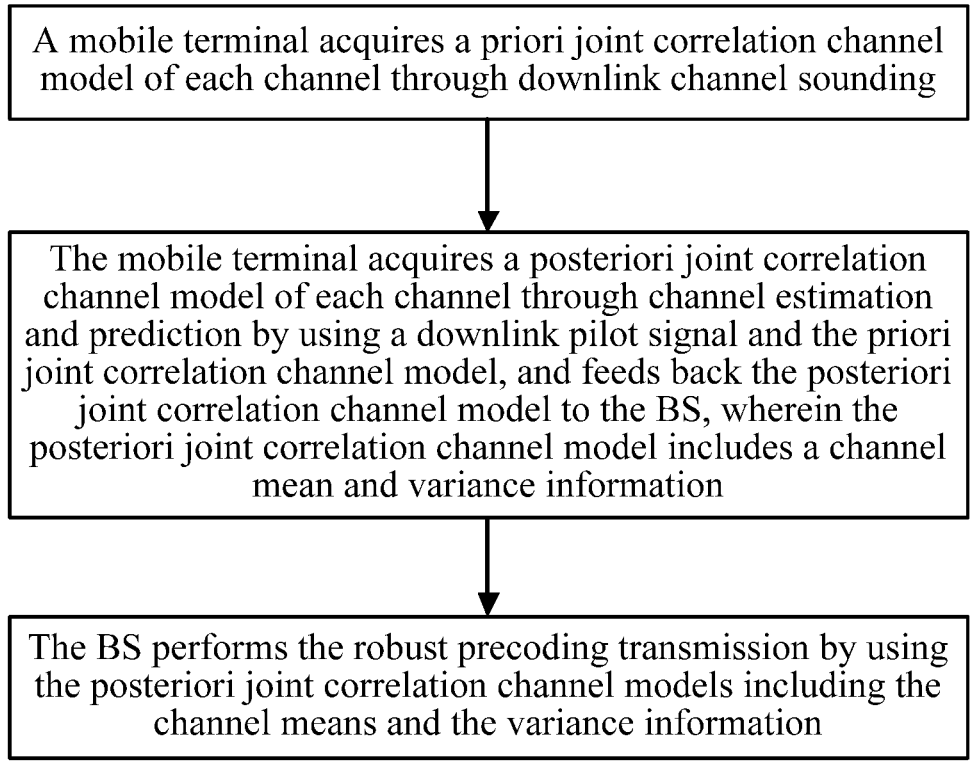
FIG. 2 is a flow diagram of another massive MIMO downlink robust precoding transmission method.

As shown in FIG. 2, another massive multiple-input multiple-output (MIMO) downlink robust precoding transmission method disclosed in an embodiment of the present invention includes that: The mobile terminals acquire their a priori jointly correlated channel models through downlink channel sounding; the mobile terminals acquire their a posteriori jointly correlated channel models through channel estimation and prediction by using downlink pilot signals and the a priori jointly correlated channel models, and feed back the a posteriori jointly correlated channel models to a base station (BS), where the a posteriori jointly correlated channel models include channel mean and channel variance information; and the BS performs robust precoding transmission by using the a posteriori jointly correlated channel models including the channel mean and the channel variance information. The mobile terminals in the present invention may also use other receiving apparatuses capable of receiving information.

Figure 3:
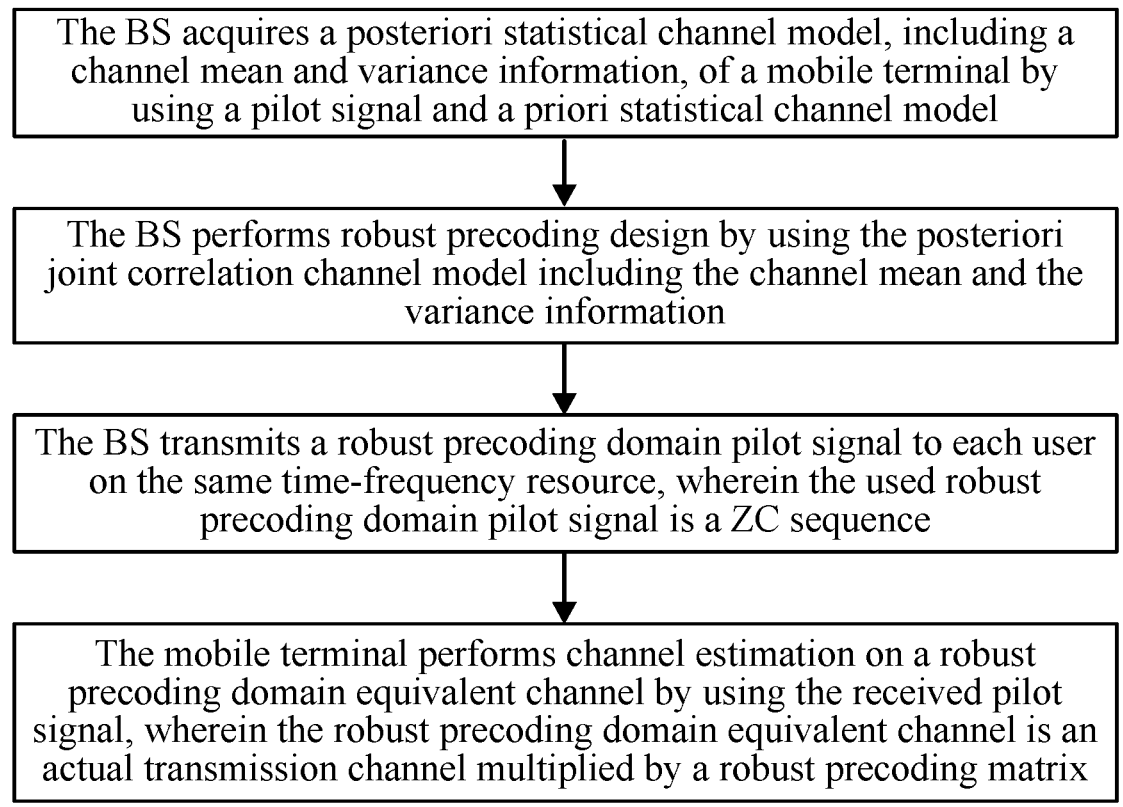
FIG. 3 is a flow diagram of a massive MIMO downlink robust precoding domain channel acquisition method.

As shown in FIG. 3, a massive multiple-input multiple-output (MIMO) downlink robust precoding domain channel acquisition method with pilot reuse_disclosed in an embodiment of the present invention includes that: a base station (BS) acquires an a posteriori statistical channel models, including channel mean and channel variance information, of the mobile terminals by using pilot signals and a priori statistical channel models; the BS performs robust precoding design by using the a posteriori statistical channel models including the channel mean and the channel variance information; the BS transmits a pilot signal in the robust precoding domain to each user on the same time-frequency resource, where the used pilot signal is a ZC sequence; and the mobile terminals perform channel estimation of the equivalent channels in the robust precoding domain by using the received pilot signals, where the equivalent channels are the realistic channels multiplied by the robust precoding matrices.

Figure 4:
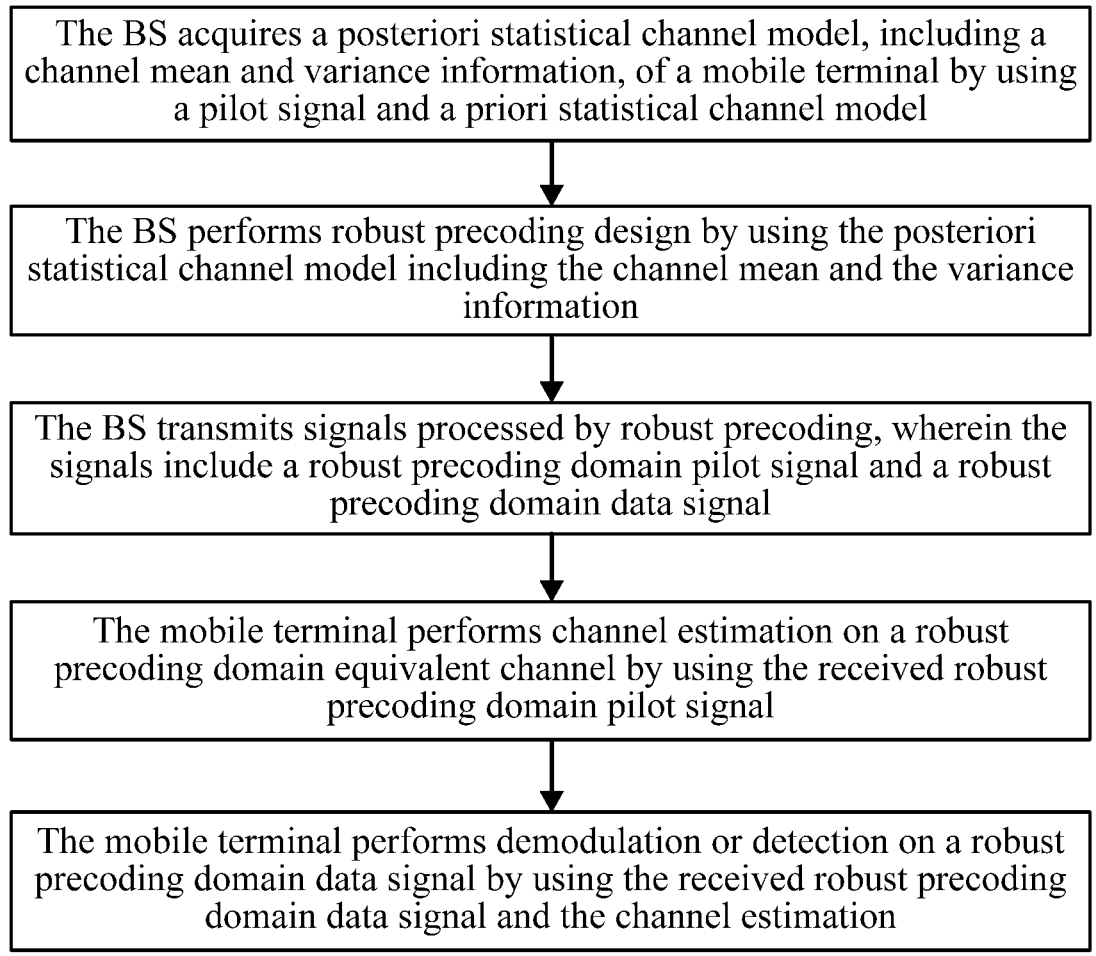
FIG. 4 is a flow diagram of a receiving method of massive MIMO downlink robust precoding transmission.

As shown in FIG. 4, a receiving method of massive multiple-input multiple-output (MIMO) downlink robust precoding transmission disclosed in an embodiment of the present invention includes that: a base station (BS) acquires a posteriori statistical channel models, including channel mean and channel variance information, of the mobile terminals by using the pilot signals and the a priori statistical channel models; the BS or transmitting apparatus performs robust precoder design by using the a posteriori jointly correlated channel models including the channel mean and the channel variance information; the BS transmits signals processed by robust precoding, where the signals include pilot signals and data signals in the robust precoding domain; the mobile terminals perform channel estimation of the equivalent channels in the robust precoding domain by using the received pilot signals; and the mobile terminals perform demodulation or detection of the precoding domain signals by using the received data signals and the channel estimations of the equivalent channels in the precoding domain.

Figure 5:
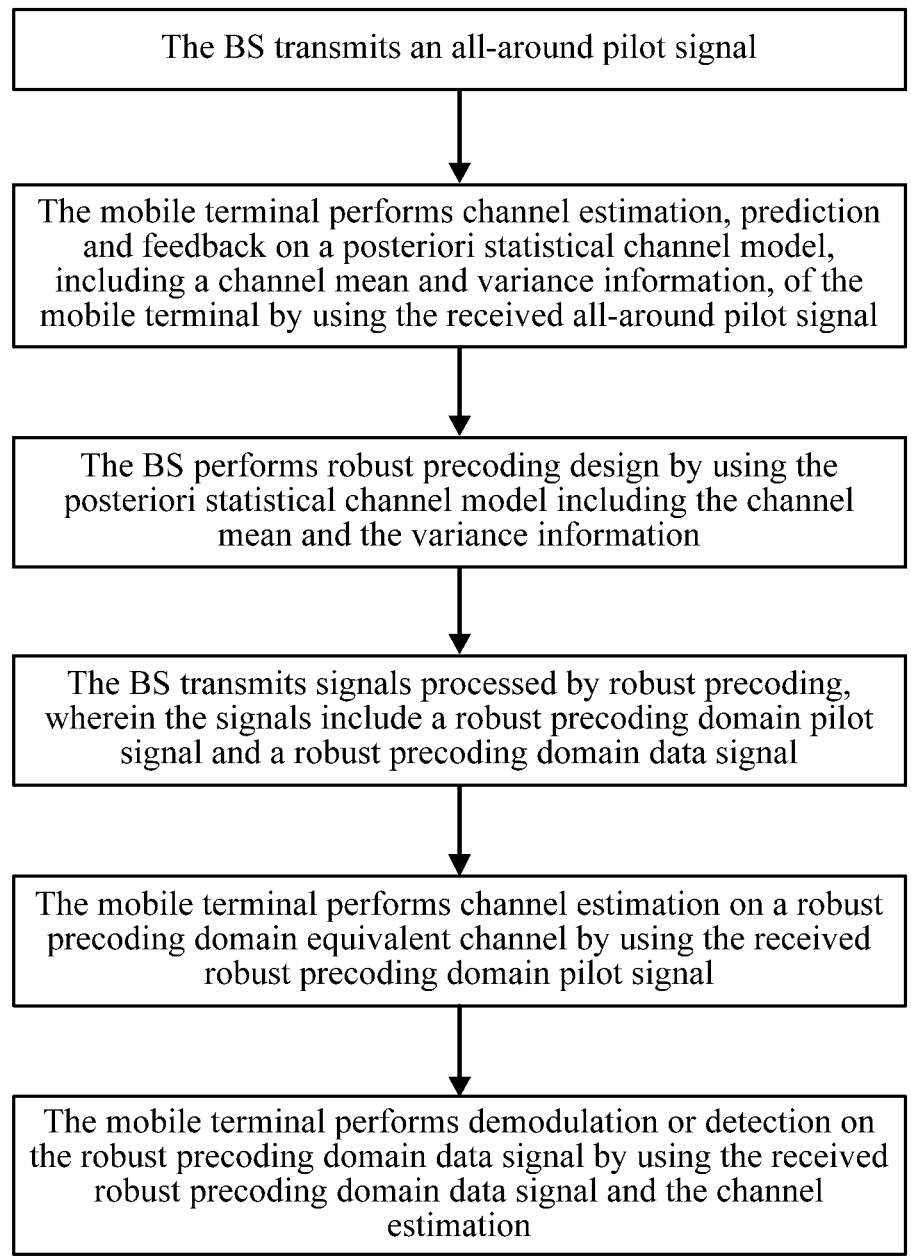
FIG. 5 is a flow diagram of another receiving method of massive MIMO downlink robust precoding transmission.

As shown in FIG. 5, another receiving method of massive multiple-input multiple-output (MIMO) downlink robust precoding transmission disclosed in an embodiment of the present invention includes that: a base station (BS) transmits a downlink omnidirectional pilot signal; the mobile terminals perform channel estimation, prediction and feedback their a posteriori statistical channel models, including channel mean and channel variance information, by using the received omnidirectional pilot signals; the BS or transmitting apparatus performs robust precoder design by using the a posteriori jointly correlated channel models including the channel mean and the variance information; the BS transmits signals processed by robust precoding, where the signals include pilot signals and data signals in the robust precoding domain; the mobile terminals perform channel estimation of the equivalent channels in the robust precoding domain by using the received pilot signals; and the mobile terminals perform demodulation or detection of the precoding domain signals by using the received data signals and the channel estimations of the equivalent channels in the precoding domain.

Figure 6:
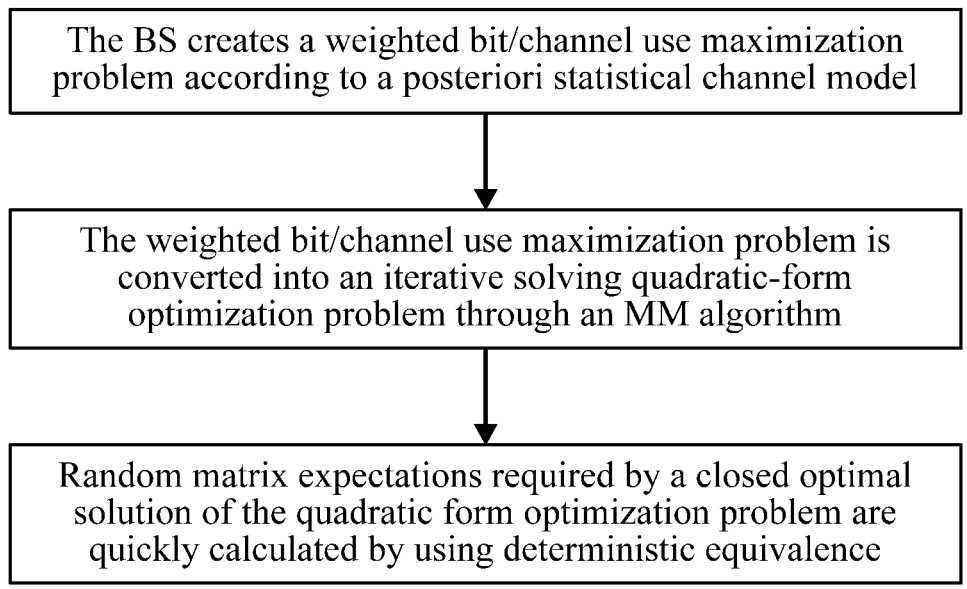
FIG. 6 is a flow diagram of a massive MIMO downlink robust linear precoder design method.

As shown in FIG. 6, a massive multiple-input multiple-output (MIMO) downlink robust precoding design method disclosed in an embodiment of the present invention includes that: a base station (BS) formulates a weighted sum-rate maximization problem according to a posteriori statistical channel models; the weighted sum-rate maximization problem is converted into iterative solving of a quadratic problem through a majorize-minimization (MM) algorithm; and expectations of certain random matrices required by a closed-form optimal solution of the quadratic problem are quickly calculated by using their deterministic equivalents.

The method of the present invention is mainly applicable to a massive MIMO system provided with a large-scale antenna array on the BS side, so as to simultaneously serve multiple users. A specific implementation process of the robust precoding transmission method disclosed in the present invention is described in detail below in conjunction with specific communication system examples. It should be noted that the method of the present invention is applicable to specific system models listed in the examples below, and is also applicable to system models with other configurations.

I. System Configuration

Consider a flat block fading large-scale MIMO system, wherein user channels remain unchanged within T symbol intervals. The MIMO system is composed of one BS and K mobile terminals. The BS is equipped with $M_r$ antennas. The kth user is equipped with $M_k$ antennas, and $$\sum_{k=1}^{K} M_k = M_r.$$

The system time resource is divided into multiple time slots, each of which includes $N_b$ time blocks (T symbol intervals). In the present embodiment, the considered massive MIMO system works in a time division duplexing (TDD) mode. For simplicity, suppose that only an uplink channel training stage and a downlink transmission stage exist, where the downlink transmission stage includes transmission of pilot signals and data signals in the precoding domain. In each time slot, the pilot signal is only transmitted on the first block. The blocks from 2 to $N_b$ are configured to transmit a downlink pilot signal and the data signals in the precoding domain. The length of an uplink training sequence is equal to the length of a block, i.e., T symbol intervals. Further, mutually orthogonal training sequences ($M_r \leq T$) are used for different uplink transmit antennas. For a frequency division duplexing (FDD) mode, the uplink channel training stage may be replaced by a downlink channel feedback stage, and the downlink transmission stage remains unchanged. Specifically, the first block transmits a downlink omnidirectional pilot signal and receives a feedback of the mobile terminal.

II. A Priori Statistical Channel Model

Assume that the channel of the considered massive MIMO system is a stationary channel, and the statistical channel model of each user is represented as a jointly correlated channel model. Specifically, the channel from the BS to the kth user on the nth block of the m-th time slot have the following structure $$H_{k,m,n} = U_k(M_k \odot W_{k,m,n}) V_k^H \quad (1)$$

where $U_k$ and $V_k^H$ are deterministic unitary matrices; $M_k$ is a deterministic matrix composed of non-negative elements, and $W_{k,m,n}$ is a matrix composed of zero-mean, unit-variance and independently and identically distributed complex Gaussian random variables. In the massive MIMO system, $M_t$ may become very large. In such case, the $V_k$ of all the users are the same. It is assumed in the present embodiment that the BS is equipped with a uniform linear antenna array with a very large number of antennas, i.e., $M_t$ is very large. In this scenario, the $V_k$ of all the users can be approximated as a DFT matrix. In summary, the channel model in equation (1) can be rewritten as $$H_{k,m,n} = U_k(M_k \odot W_{k,m,n}) V_{M_t}^H \quad (2)$$

where $V_{M_t}$ denotes an $M_t \times M_t$-dimensional DFT matrix. In equation (2), the channel model can be viewed as an a priori model of the channel before the channel estimation. Further, the temporal evolution of the channel between one block and another block is denoted by a first-order Gauss-Markov random model as $$H_{k,m,n+1} = \alpha_k H_{k,m,n} + \sqrt{1-\alpha_k^2} U_k(M_k \odot W_{k,m,n+1}) V_{M_t}^H \quad (3)$$

where $\alpha_k$ is the time correlation factor related to the user moving speed. A common calculation method of $\alpha_k$ based on Jakes' autocorrelation model is used, i.e., $\alpha_k = J_0(2\pi v_k f_c T/c)$ where $J_0(\bullet)$ denotes the first-class zero-order Bessel function; $v_k$ denotes the speed of the kth user; $f_c$ denotes the carrier frequency, and c is the speed of light. The model in equation (3) is configured to perform the channel prediction.

A channel energy coupling matrix $\Omega_k$ of the massive MIMO system is defined as $\Omega_k = M_k \odot M_k$. For the considered massive MIMO system working in the TDD mode, it is assumed that the BS acquires the a priori jointly correlated channel model of each user through the uplink channel sounding, i.e., $U_k$ and $\Omega_k$ are acquired. For the massive MIMO system working in the FDD mode, the a priori jointly correlated channel model of each user can be acquired through the user downlink channel sounding.

III. A Posteriori Statistical Channel Model

For the considered massive MIMO system working in the TDD mode, the channel estimation by using the uplink pilot signals received by the BS is performed to acquire the CSI of the downlink channels based on channel reciprocity. Let $Y_{m,1}^{BS} \in \mathbb{C}^{M_r \times T}$ denote the receiving matrix of the BS on the first block of the time slot m and $\mathbb{C}^{M_r \times T}$ denotes a set of $M_r \times T$ complex matrices, written as $$Y_{m,1}^{BS} = \sum_{k=1}^{K} H_{k,m,1}^T X_{k,m,1}^{UE} + Z_{m,1}^{BS} \quad (4)$$

where $X_{k,m,n}^{UE} \in \mathbb{C}^{M_k \times T}$ denotes the uplink pilot matrix of the kth user in the first block on the time slot m; and $Z_{m,1}^{BS}$ denotes the uplink received random noise matrix having independently and identically distributed complex Gaussian random variable elements with zero-mean, variance $\sigma_{BS}^2$.

When $Y_{m,1}^{BS}$ is known, the a posteriori mean of $H_{k,m,n}$, i.e., the MMSE estimation $\hat{H}_{k,m,n}$ is obtained as $$\hat{H}_{k,m,n} = \alpha_k^{n-1} U_k(\Delta_k \odot U_K^H(X_{k,m,l}^{UE})* (Y_{m,l}^{BS})^T V_{M_t}) V_{M_t}^H \text{ where} \quad (5)$$

$$[\Delta_{k,m,n}]_{ij}^2 = \frac{[M_k]_{ij}^2}{[M_k]_{ij}^2 + \sigma_{BS}^2}. \quad (6)$$

Further, the a posteriori model of $H_{k,m,n}$ when $Y_{m,1}^{BS}$ is known is obtained as $$H_{k,m,n} = \hat{H}_{k,m,n} + U_k(\Xi_k \odot W_{k,m,n}) V_{M_t}^H \quad (7)$$

where $W_{k,m,n}$ is the matrix composed of the independently and identically distributed, zero-mean and unit-variance complex Gaussian random variable elements, and the element in $\Xi_k \in \mathbb{C}^{M_k \times M_t}$ is $$[\Xi_{k,m,n}]_{ij}^2 = [M_k]_{ij}^2 - \alpha_k^{2(n-1)} \frac{[M_k]_{ij}^4}{[M_k]_{ij}^2 + \sigma_{BS}^2}. \quad (8)$$

Equation (7) shows that non-perfect CSI of each user equipment (UE) obtained at the BS side can be modeled as a jointly correlated channel model including channel mean (or referred to as expected value) and channel variance information, and the model includes channel estimation error, channel change and the influence of space correlation. In equation (7), the channel information acquired by the BS is the conditional mean (or referred to as conditional expected value) and the conditional variance information under the condition of the BS receiving uplink pilot signals. Further, the a posteriori model described in equation (7) is a general model of the imperfect CSI acquired at the BS side of the massive MIMO system under different moving scenarios. When $\alpha_k$ is very close to 1, the model is applicable to the communication scenario where the channels of the users are quasi-static. When $\alpha_k$ becomes very small, the model is applicable to the communication scenario where the users are moving very fast. Further, $\hat{H}_{k,m,n}$ becomes almost zero in this scenario, and the difference between the a posteriori model in equation (7) and the a priori model in equation (2) becomes very small. By setting the $\alpha_k$ to different values according to different moving speeds of the users, the established a posteriori model can be configured to describe channel models of the massive MIMO in various typical mobile communication scenarios.

For the massive MIMO system working in the FDD mode, the a posteriori jointly correlated channel model in equation (7) can also be obtained through the channel estimation, prediction and feedback of the mobile terminal. Specifically, the BS transmits the downlink omnidirectional pilot signal, and the mobile terminal performs the channel estimation, prediction and feedback by using the received omnidirectional pilot signal. In such case, the channel information acquired in equation (7) becomes conditional mean (or referred to as conditional expected value) and conditional variance information under the condition of the mobile terminals receiving downlink pilot signals.

IV. Robust Precoder Design

1. Problem Statement

Consider the downlink transmission on the time slot m. Let $x_{k,m,n}$ denote the $M_k \times 1$-dimensional transmitting vector of the kth UE on the nth block of the time slot m, and its covariance matrix is an identity matrix. Within one symbol interval on the nth block of the time slot m, the received signal $y_{k,m,n}$ of the kth UE can be denoted as $$y_{k,m,n} = H_{k,m,n} P_{k,m,n} x_{k,m,n} + \sum_{l \neq k}^{K} H_{k,m,n} P_{l,m,n} x_{l,m,n} + z_{k,m,n} \quad (9)$$

where $P_{k,m,n}$ is an $M_k \times d_k$ dimensional precoding matrix of the kth UE, $z_{k,m,n}$ is a complex Gaussian random noise vector distributed as $CN(0, \sigma_z^2 I_{M_k})$, $\sigma_z^2$ is the variance of each element of the noise vector, and $I_{M_k}$ is an $M_k \times M_k$ identity matrix. Since the design of the precoding matrix $P_{k,m,n}$ is based on the a posteriori statistical model that can adapt to various typical moving scenarios, i. e., have robustness, the precoding matrix is called robust precoder. To reduce the system implementation complexity, the pilot signals and the data signals only need to be transmitted in the dimension-reduced robust precoding domain. The transmitted pilot signal in the robust precoding domain are on the same time-frequency resource, and various user pilots are not required to be orthogonal, i. e., the pilot signals can be reused. Specifically, the precoding domain pilot signal transmitted by the BS to each user is a frequency domain signal generated by modulating a ZC sequence or a group of ZC sequences. The mobile terminal performs the channel estimation of the equivalent channel in the robust precoding domain after receiving the pilot signal. The robust precoding domain equivalent channel is $H_{k,m,n} P_{k,m,n}$. For simplicity, it is supposed that the UE end can obtain the perfect CSI of its robust precoding domain equivalent channel matrix. Each user detects the robust precoding domain signal by using the received data signal after receiving the data signal. The total interference and noise of each UE $$z'_{k,m,n} = \sum_{l \neq k}^{K} H_{k,m,n} P_{l,m,n} x_{l,m,n} + z_{k,m,n} \quad (10)$$

is viewed as Gaussian noise. Let $R_{k,m,n}$ denote the covariance matrix of $z_{k,m,n}'$ and we have $$R_{k,m,n} = \sigma_z^2 I_{M_k} + E_{H_{k,m,n}} \left\{ \sum_{l \neq k}^{K} H_{k,m,n} P_{l,m,n} P_{l,m,n}^H H_{k,m,n}^H \right\} \quad (11)$$

where the expectation function $E_{H_{k,m,n}}\{\bullet\}$ denotes an expectation function for $H_{k,m,n}$ based on long-term statistical information at the user side. According to the channel reciprocity, the long-term statistical channel information at the user side is consistent with the long-term statistical channel information at the BS side provided in equation (2). Therefore, the expectation function $E_{H_{k,m,n}}\{\bullet\}$ may be calculated according to equation (2). Assume that $R_{k,m,n}$ of the kth UE is known, and in such case, the sum-rate of the kth user is denoted as $$R_{k,m,n} = E_{H_{k,m,n}|Y_{m,l}^{BS}}\{\log \det(I_{M_k} + R_{k,m,n}^{-1} H_{k,m,n} P_{k,m,n} P_{k,m,n}^H H_{k,m,n}^H)\} \quad (12)$$

where $E_{H_{k,m,n}|Y_{m,l}^{BS}}\{\bullet\}$ denotes a condition expectation function for $H_{k,m,n}$ obtained by the a posteriori model in equation (7). The function $$f(P_{1,m,n}, P_{2,m,n}, \ldots, P_{K,m,n}) = \sum_{k=1}^{K} w_k R_{k,m,n}$$

is defined as a weighted ergodic sum-rate, i.e., a conditional mean of the weighted sum-rate calculated according to the established a posteriori statistical channel model. The present embodiment aims to design precoding matrices $P_{1,m,n}$, $P_{2,m,n}$, ..., $P_{K,m,n}$ to maximize the weighted ergodic sum-rate, i.e., to solve the optimization problem $$\arg\max_{P_{1,m,n}, P_{2,m,n}, \ldots, P_{K,m,n}} f(P_{1,m,n}, P_{2,m,n}, \ldots, P_{K,m,n}) \text{ s.t. } tr\left(\sum_{k=1}^{K} P_{k,m,n} P_{k,m,n}^H\right) \leq P \quad (13)$$

where $w_k$ is a weighting factor of the kth user, and P is total power constraint.

2. MM Algorithm for Robust Precoder Design

The objective function in the optimization problem (13) is a very complicated function of the precoding matrices, and thus this problem is very difficult to solve directly. A minorize maximization or majorize minimization (MM) algorithm may convert the precoding design problem on weighted sum-rate maximization into iterative solving of a quadratic optimization problem. The key of the MM algorithm is to find out a simple minorizing function of the objective function. For simplicity, unilateral correlation matrices $\eta_{k,m,n}^{pri}(\tilde{C})$ and $\tilde{\eta}_{k,m,n}^{pri}(C)$ are defined as $$\eta_{k,m,n}^{pri}(\tilde{C}) = E_{H_{k,m,n}}\{H_{k,m,n}\tilde{C}H_{k,m,n}^H\} \quad (14)$$

$$\tilde{\eta}_{k,m,n}^{pri}(C) = E_{H_{k,m,n}}\{H_{k,m,n}^H C H_{k,m,n}\} \quad (15)$$

where $$\tilde{C} \in \mathbb{C}^{M_t \times M_t} \text{ and } C \in \mathbb{C}^{M_k \times M_k}. \quad (16)$$

Define $R_{k,m,n}^{(d)}$ as $$R_{k,m,n}^{(d)} = \sigma_z^2 I_{M_k} + \sum_{l \neq k}^{K} \tilde{\eta}_{k,m,n}^{pri}\left(P_{l,m,n}^{(d)}\left(P_{l,m,n}^{(d)}\right)^H\right).$$

Let $E_{k,m,n}$ and $E_{k,m,n}^{(d)}$ be (17)

$$E_{k,m,n} = \left(I_{d_k} + P_{k,m,n}^H H_{k,m,n}^H R_{k,m,n}^{-1} H_{k,m,n} P_{k,m,n}\right)^{-1}$$

and $$E_{k,m,n}^{(d)} = \left(I_{d_k} + \left(P_{k,m,n}^{(d)}\right)^H H_{k,m,n}^H \left(R_{k,m,n}^{(d)}\right)^{-1} H_{k,m,n} P_{k,m,n}^{(d)}\right)^{-1}. \quad (18)$$

Then, the rate mean $R_{k,m,n}$ of the kth user is $$R_{k,m,n} = E_{H_{k,m,n}|Y_{m,1}^{BS}}\{\log\det(E_{k,m,n}^{-1})\}. \quad (19)$$

The function $g_1(P_{1,m,n}, P_{2,m,n}, \ldots, P_{K,m,n}|P_{1,m,n}^{(d)}, P_{2,m,n}^{(d)}, \ldots, P_{K,m,n}^{(d)})$ is defined as $$g_1(P_{1,m,n}, P_{2,m,n}, \ldots, P_{K,m,n} | P_{1,m,n}^{(d)}, P_{2,m,n}^{(d)}, \ldots, P_{K,m,n}^{(d)}) = \quad (20)$$

$$\sum_{k=1}^{K} w_k c_{k,m,n}^{(d)} + \sum_{k=1}^{K} w_k \, tr\left(\left(A_{k,m,n}^{(d)}\right)^H P_{k,m,n}\right) +$$

$$\sum_{k=1}^{K} w_k \, tr\left(\left(A_{k,m,n}^{(d)}\right) P_{k,m,n}^H\right) - \sum_{k=1}^{K} w_k \, tr\left(D_{k,m,n}^{(d)} P_{k,m,n} P_{k,m,n}^H\right)$$

where $$c_{k,m,n}^{(d)} = E_{H_{k,m,n}|Y_{m,1}^{BS}}\{\log\det\left(\left(E_{k,m,n}^{(d)}\right)^{-1}\right)\} + \quad (21)$$

$$tr(I_{d_k}) - E_{H_{k,m,n}|Y_{m,1}^{BS}}\{tr\left(\left(E_{k,m,n}^{(d)}\right)^{-1}\right)\} - \sigma_z^2 E_{H_{k,m,n}|Y_{m,1}^{BS}}$$

$$\{tr\left(\left(P_{k,m,n}^{(d)}\right)^H H_{k,m,n}^H \left(R_{k,m,n}^{(d)}\right)^{-1}\left(R_{k,m,n}^{(d)}\right)^{-1} H_{k,m,n} P_{k,m,n}^{(d)} E_{k,m,n}^{(d)}\right)\}$$

$$A_{k,m,n}^{(d)} = E_{H_{k,m,n}|Y_{m,1}^{BS}}\{H_{k,m,n}^H\left(R_{k,m,n}^{(d)}\right)^{-1} H_{k,m,n}^{(d)}\} P_{k,m,n}^{(d)} \quad (22)$$

$$B_{k,m,n}^{(d)} = E_{H_{k,m,n}|Y_{m,1}^{BS}}\{H_{k,m,n}^H\left(R_{k,m,n}^{(d)}\right)^{-1} H_{k,m,n}\} - \quad (23)$$

$$E_{H_{k,m,n}|Y_{m,1}^{BS}}\{H_{k,m,n}^H\left(R_{k,m,n}^{(d)} + H_{k,m,n}P_{k,m,n}^{(d)}\left(P_{k,m,n}^{(d)}\right)^H H_{k,m,n}^H\right)^{-1} H_{k,m,n}^{(d)}\}$$

$$C_{k,m,n}^{(d)} = \tilde{\eta}_{k,m,n}^{pri}\left(\left(R_{k,m,n}^{(d)}\right)^{-1}\right) - \quad (24)$$

$$\tilde{\eta}_{k,m,n}^{pri}\left(E_{H_{k,m,n}|Y_{m,1}^{BS}}\left\{\left(R_{k,m,n}^{(d)} + H_{k,m,n}P_{k,m,n}^{(d)}\left(P_{k,m,n}^{(d)}\right)^H H_{k,m,n}^H\right)^{-1}\right\}\right)$$

$$D_{k,m,n}^{(d)} = w_k B_{k,m,n}^{(d)} - \sum_{l \neq k}^{K} w_l C_{l,m,n}^{(d)} \quad (25)$$

then $g_1$ is the minorizing function of the objective function $f$ on $P_{1,m,n}^{(d)}, P_{2,m,n}^{(d)}, \ldots, P_{K,m,n}^{(d)}$. By using $g_1$, the original optimization problem (13) can be converted into the following iterative problem $$P_{1,m,n}^{(d+1)}, P_{2,m,n}^{(d+1)}, \ldots, \quad (26)$$

$$P_{K,m,n}^{(d+1)} = \arg\max_{P_{1,m,n}, P_{2,m,n}, \ldots, P_{K,m,n}} g_1(P_{1,m,n}, P_{2,m,n}, \ldots, P_{K,m,n} | P_{1,m,n}^{(d)},$$

$$P_{2,m,n}^{(d)}, \ldots, P_{K,m,n}^{(d)}) \text{ s.t. } tr\left(\sum_{k=1}^{K} P_{k,m,n}P_{k,m,n}^H\right) \leq P.$$

In equation (26), a limit point of the precoding matrix sequence provided in equation (26) is a local maximum point of the original optimization problem (13). Further, the optimization problem in equation (26) is a concave quadratic function of the precoding matrices $P_{1,m,n}, P_{2,m,n}, \ldots, P_{K,m,n}$. The optimal solution can be directly obtained by the Lagrange multiplier method:

$$P_{k,m,n}^{(d+1)} = (D_{k,m,n}^{(d)} + \mu^* I_{M_t})^{-1} w_k A_{k,m,n}^{(d)} \quad (27)$$

where $\mu^*$ is an optimal Lagrange multiplier corresponding to the energy constraint. Observing equation (27) and equations (22) to (25), we have that the calculation of precoders needs to use expectations of some random matrices. How to provide a fast calculation method by using deterministic equivalents will be further described in the following.

3. Robust Precoder Design Algorithm Based on Deterministic Equivalent

It can be observed from equations (23) and (24) that the matrices $B_{k,m,n}^{(d)}$ and $C_{k,m,n}^{(d)}$ and the rate $R_{k,m,n}$ are closely related to derivatives of $P_{k,m,n}P_{k,m,n}^H$ and $P_{l,m,n}P_{l,m,n}^H$, $l \neq k$. The deterministic equivalents of $B_{k,m,n}^{(d)}$ and $C_{k,m,n}^{(d)}$ can be derived according to the deterministic equivalent of $R_{k,m,n}$. It is defined that $$\eta_{k,m,n}^{post}(\tilde{C}) = E_{H_{k,m,n}|Y_{m,1}^{BS}}\{H_{k,m,n}\tilde{C}H_{k,m,n}^H\} \quad (28)$$

$$\tilde{\eta}_{k,m,n}^{post}(C) = E_{H_{k,m,n}|Y_{m,1}^{BS}}\{H_{k,m,n}^H C H_{k,m,n}\}. \quad (29)$$

The channel model provided in equation (7) is a jointly correlated channel model having a non-zero mean. For this type of model, the deterministic equivalent of $R_{k,m,n}$ is obtained as $$R_{k,m,n} = \log\det(I_{M_t} + \Gamma_{k,m,n}P_{k,m,n}P_{k,m,n}^H) + \log\det$$
$$(\tilde{\Phi}_{k,m,n}) - tr(\eta_{k,m,n}^{post}(P_{k,m,n}G_{k,m,n}P_{k,m,n}^H)$$
$$R_{k,m,n}^{-1/2} \tilde{G}_{k,m,n} R_{k,m,n}^{-1/2}) \quad (30)$$

or $$R_{k,m,n} = \log\det(I_{M_k} + \tilde{\Gamma}_{k,m,n}R_{k,m,n}^{-1}) + \log\det(\Phi_{k,m,n}) - tr$$
$$(P_{k,m,n}G_{k,m,n}P_{k,m,n}^H \tilde{\eta}_{k,m,n}^{post}(R_{k,m,n}^{-1/2} \tilde{G}_{k,m,n}$$
$$R_{k,m,n}^{-1/2})) \quad (31)$$

where $\Phi_{k,m,n}$, $\tilde{\Phi}_{k,m,n}$, $\Gamma_{k,m,n}$, $\tilde{\Gamma}_{k,m,n}$, $G_{k,m,n}$, $\tilde{G}_{k,m,n}$ are obtained through iterative equations $$\Phi_{k,m,n} = I_{d_k} + P_{k,m,n}^H \tilde{\eta}_{k,m,n}^{post}(R_{k,m,n}^{-1/2} \tilde{G}_{k,m,n} R_{k,m,n}^{-1/2})$$
$$P_{k,m,n} \quad (32)$$

$$\tilde{\Phi}_{k,m,n} = I_{M_k} + R_{k,m,n}^{-1/2} \eta_{k,m,n}^{post}(P_{k,m,n}G_{k,m,n}P_{k,m,n}^H)$$
$$R_{k,m,n}^{-1/2} \quad (33)$$

$$\Gamma_{k,m,n} = \tilde{\eta}_{k,m,n}^{post}(R_{k,m,n}^{-1/2} \tilde{G}_{k,m,n} R_{k,m,n}^{-1/2}) + \hat{H}_{k,m,n}^H$$
$$R_{k,m,n}^{-1/2} \tilde{\Phi}_{k,m,n}^{-1} R_{k,m,n}^{-1/2} \hat{H}_{k,m,n} \quad (34)$$

$$\tilde{\Gamma}_{k,m,n} = \eta_{k,m,n}^{post}(P_{k,m,n}G_{k,m,n}P_{k,m,n}^H) + \hat{H}_{k,m,n}P_{k,m,n}$$
$$\Phi_{k,m,n}^{-1} P_{k,m,n}^H \hat{H}_{k,m,n}^H \quad (35)$$

$$\tilde{G}_{k,m,n} = (I_{d_k} + P_{k,m,n}^H \Gamma_{k,m,n} P_{k,m,n})^{-1} \quad (36)$$

$$\tilde{G}_{k,m,n} = (I_{M_k} + R_{k,m,n}^{-1/2} \tilde{\Gamma}_{k,m,n} R_{k,m,n}^{-1/2})^{-1} \quad (37),$$

and the deterministic equivalents of $B_{k,m,n}^{(d)}$ and $C_{k,m,n}^{(d)}$ can be further obtained as $$\bar{B}_{k,m,n}^{(d)} = \hat{H}_{k,m,n}^H (R_{k,m,n}^{(d)})^{-1} \hat{H}_{k,m,n}^{(d)} + \tilde{\eta}_{k,m,n}^{post}((R_{k,m,n}^{(d)})^{-1}) -$$
$$(I_{M_t} + \Gamma_{k,m,n} P_{k,m,n} P_{k,m,n}^H)^{-1} \Gamma_{k,m,n} \quad (38)$$

$$\bar{C}_{k,m,n}^{(d)} = \tilde{\eta}_{k,m,n}^{pri}((R_{k,m,n}^{(d)})^{-1}) - \tilde{\eta}_{k,m,n}^{pri}((R_{k,m,n}^{(d)} + \tilde{\Gamma}_{k,m,n})^{-1}). \quad (39)$$

Performing fast calculation by using the deterministic equivalents of $B_{k,m,n}^{(d)}$ and $C_{k,m,n}^{(d)}$, the precoder design based on the deterministic equivalent is obtained as $$P_{k,m,n}^{(d+1)} = \left(\overline{D}_{k,m,n}^{(d)} + \mu^* I_{M_t}\right)^{-1} w_k A_{k,m,n}^{(d)} \quad (40)$$

where $$\overline{D}_{k,m,n}^{(d)} = w_k \overline{B}_{k,m,n}^{(d)} - \sum_{l \neq k}^{K} w_l \overline{C}_{l,m,n}^{(d)}. \quad (41)$$

In summary, the robust precoder design is summarized as the following steps:

Step 1: Set d to 0, randomly generate a group of precoding matrices $P_{1,m,n}^{(d)}, P_{2,m,n}^{(d)}, \ldots, P_{K,m,n}^{(d)}$, and normalize them to meet the total energy constraint;

Step 2: Calculate $R_{k,m,n}^{(d)}$ according to equation (16);

Step 3: Calculate $\Gamma_{k,m,n}$ and $\tilde{\Gamma}_{k,m,n}$ according to equations (34) to (35);

Step 4: Calculate $A_{k,m,n}^{(d)}, \overline{B}_{k,m,n}^{(d)}$ and $\overline{C}_{k,m,n}^{(d)}$ according to equations (22), (38) and (39);

Step 5: Update $P_{1,m,n}^{(d+1)}, P_{2,m,n}^{(d+1)}, \ldots, P_{K,m,n}^{(d+1)}$, and set d to d+1;

Repeat steps 2 to 5 until convergence or a preset objective is achieved.

V. Implementation Effects

In order to make those skilled in the art understand the solution of the present invention better, sum-rate result comparisons between the robust precoding transmission method in the present embodiment and existing methods under two specific system configurations are listed as below.

Figure 7:
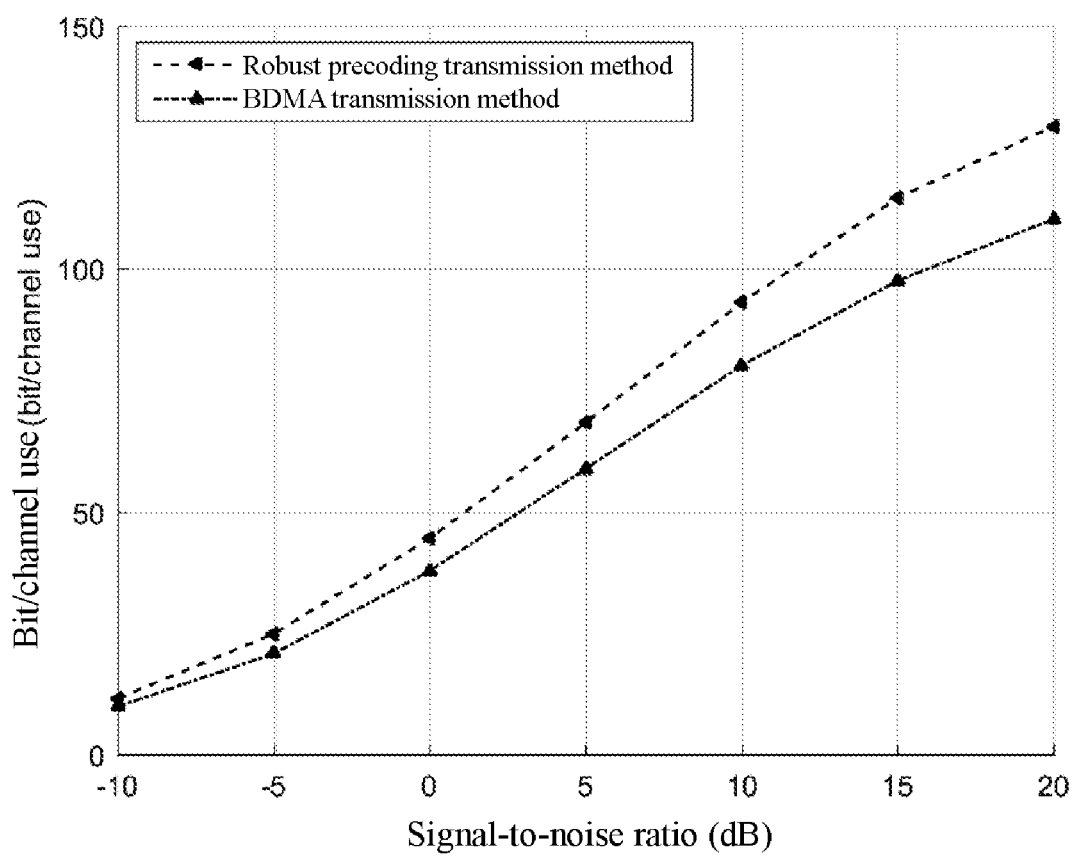
FIG. 7 is a comparative schematic diagram of sum-rate results of the robust precoding transmission method in the present embodiment and the beam division multiple access (BDMA) method over the downlink of the considered massive MIMO system.

Firstly, comparisons between the robust precoding transmission method in the present embodiment and a beam division multiple access (BDMA) method are provided. Consider a massive MIMO system with that the number of the transmit antennas of the BS $M_t$=128, the number of users K=10 and the number of user antennas $M_k$=4. The time correlation factor $\alpha_k$ of each user is divided into five types, including $\alpha_1, \alpha_2$=0.999, $\alpha_3, \alpha_4$=0.9, $\alpha_5, \alpha_6$=0.5, $\alpha_7, \alpha_8$=0.1 and $\alpha_9, \alpha_{10}$=0, which denote the typical moving scenarios of the user at different moving speeds. FIG. 7 illustrates the sum-rate result comparison between the robust precoding transmission method in the present embodiment and a BDMA method of the downlink in the considered massive MIMO system. It can be seen from FIG. 7 that the robust precoding transmission method in the present embodiment is obviously superior to the BDMA method. This is because the BS in the robust precoding transmission method performs the robust precoding transmission by using the a posteriori jointly correlated channel model including the channel mean (or referred to as channel expected value) and the channel variance information, and the BDMA method performs the transmission by using the a priori jointly correlated channel model including the channel variance information only, and cannot fully use statistical channel information that can be acquired by the BS.

Figure 8:
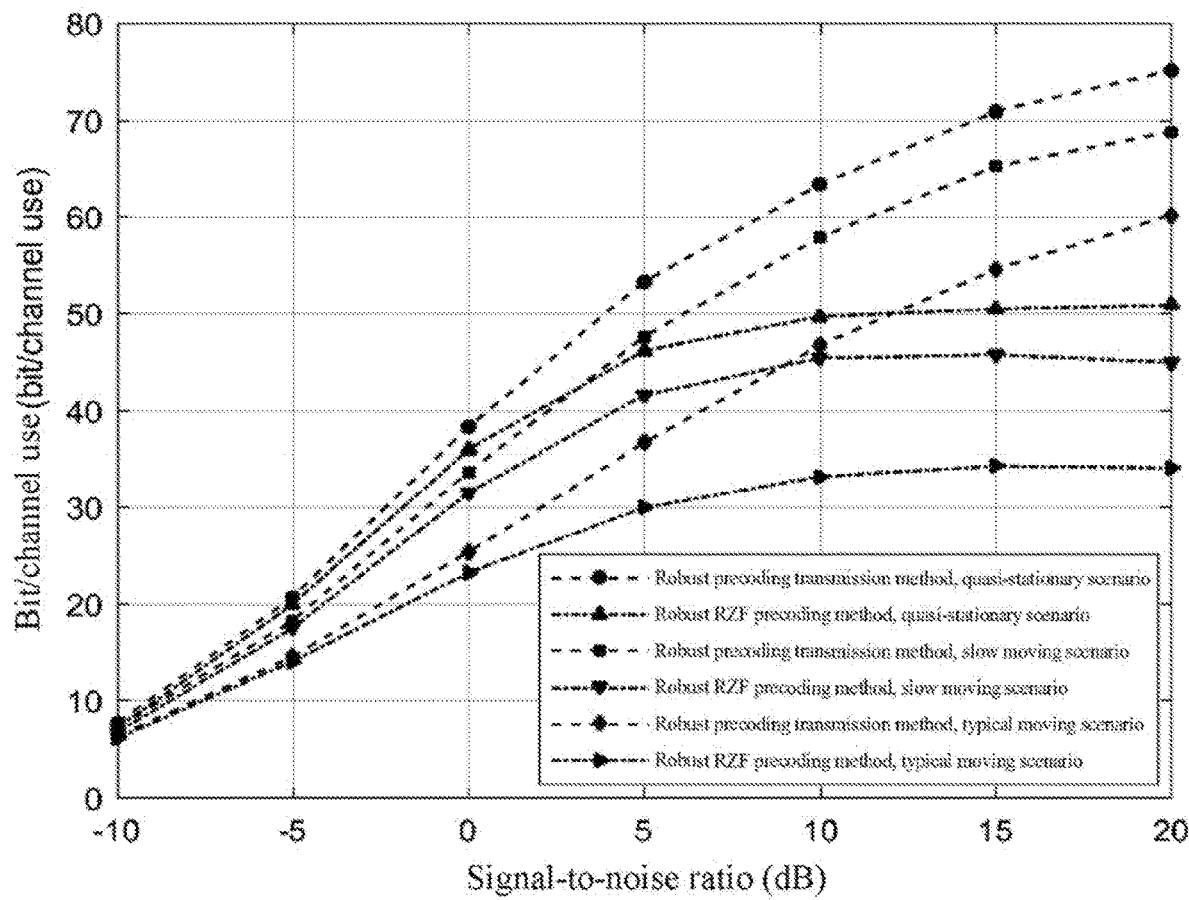
FIG. 8 is a comparative schematic diagram of sum-rate results of the robust precoding transmission method in the present embodiment and the robust regularized zero forcing (RZF) method in three different moving scenarios over the downlink of the considered massive MIMO system.

Secondly, a comparison between the robust precoding transmission method in the present embodiment and a robust regularized zero forcing (RZF) precoding method is provided. The robust RZF method is an extension of the RZF precoding method widely applied in a massive MIMO system with single-antenna users under the imperfect CSI. A massive MIMO system with $M_t$=128, K=20 and $M_k$=1 is considered. FIG. 8 illustrates a sum-rate result comparison between the robust precoding transmission method in the present embodiment and the robust RZF method of the downlink in the considered massive MIMO system in three different moving scenarios. In a quasi-static scenario, $\alpha_k$ of all the users are equal to 0.999. In a slow moving scenario, $\alpha_k$ are divided into two types: one half of them are equal to 0.999, and the other half of them are equal to 0.9. In a typical moving scenario, $\alpha_k$ are divided into five types, including $\alpha_1 \sim \alpha_4$=0.999, $\alpha_5 \sim \alpha_8$=0.9, $\alpha_9 \sim \alpha_{12}$=0.5, $\alpha_{13} \sim \alpha_{16}$=0.1 and $\alpha_{17} \sim \alpha_{20}$=0. It can be seen from FIG. 8 that the performance of the robust precoding transmission method in the present embodiment under three different moving scenarios is superior to that of the robust RZF precoding method. Further, it can be observed that the performance gain is relatively small at low SNR, and gradually becomes significant as the SNR increases. It shows that, compared with the robust RZF precoding method, the robust precoding transmission method in the present embodiment can mitigate inter-user interference more effectively.

It should be understood that, in the embodiments provided in this application, the disclosed method may be implemented in other manners without departing from the spirit and scope of this application. The embodiments herein are only exemplary examples and should not be construed as a limitation, and the specific contents described should not be construed as limiting the objectives of this application. For example, some features may be ignored or not implemented.

The technical means disclosed in the solutions of the present invention is not limited to the technical means disclosed in the above implementations, and also includes technical solutions formed by any combination of the above technical features. It should be noted that a person of ordinary skill in the art may make various improvements and refinements without departing from the principle of the present invention. All such modifications and refinements shall still fall within the protection scope of the present invention.

What is claimed is:

1. A method for massive multiple-input multiple-output (MIMO) robust precoding transmission under imperfect channel state information (CSI), comprising:
   by using pilot signals and an a priori statistical correlation channel model, a base station (BS) or transmitting apparatus acquires an a posteriori statistical channel models of mobile terminals or receiving apparatuses, wherein the a posteriori statistical channel model includes:
   channel mean or expected value, and
   channel variance information; and
   the BS or transmitting apparatus performs robust precoding transmission, by using the a posteriori statistical channel models including the channel mean or expected value and the channel variance information;
   wherein in the robust precoding transmission, the BS or transmitting apparatus performs linear precoding matrix design of each mobile terminal or receiving apparatus according to a maximization criterion of a weighted ergodic sum-rate, wherein the weighted ergodic sum-rate is a conditional mean of a weighted sum-rate calculated according to the a posteriori statistical channel model.

2. The method for massive MIMO robust precoding transmission under imperfect CSI according to claim 1, wherein the a priori statistical correlation channel model is acquired through the following step:
   the BS or transmitting apparatus acquires the a priori statistical correlation channel model through uplink channel sounding;

or, the mobile terminal or receiving apparatus acquires the a priori statistical correlation channel model through downlink channel sounding.

3. The method for massive MIMO robust precoding transmission under imperfect CSI according to claim 1, wherein the a priori statistical correlation channel model uses one model selected from the group consisting of a jointly correlated channel model, a separately correlated channel model and a fully correlated channel model.

4. The method for massive MIMO robust precoding transmission under imperfect CSI according to claim 1, wherein the a posteriori statistical channel model is acquired through the following step:

the BS or transmitting apparatus acquires channel information through channel estimation and prediction by using an uplink pilot signal and an a priori jointly correlated channel model;

or the mobile terminal or receiving apparatus acquires channel information based on channel estimation, prediction and feedback by using a downlink pilot signal and an a priori jointly correlated channel model.

5. The method for massive MIMO robust precoding transmission under imperfect CSI according to claim 1, wherein the channel mean or expected value and the channel variance information in the a posteriori statistical channel model include posterior channel mean or expected value and posterior channel variance information.

6. The method for massive MIMO robust precoding transmission under imperfect CSI according to claim 5, wherein the posterior channel mean or expected value and the posterior channel variance information comprise:

conditional mean or expected value and conditional variance information of the channels under the condition of the BS or transmitting apparatus receiving uplink pilot signals;

or conditional mean or expected value and conditional variance information of the channels under the condition of mobile terminals or receiving apparatuses receiving downlink pilot signals.

7. The method for massive MIMO robust precoding transmission under imperfect CSI according to claim 1, wherein the a posteriori statistical channel model is the one that involves channel estimation errors, channel aging and the influence of space correlation.

8. The method for massive MIMO robust precoding transmission under imperfect CSI according to claim 1, wherein the a posteriori statistical channel model uses one model selected from the group consisting of a jointly correlated channel model, a separately correlated model and a fully correlated model.

9. The method for massive MIMO robust precoding transmission under imperfect CSI according to claim 1, wherein in the robust precoding transmission, when the BS or transmitting apparatus performs the linear precoder matrix design of each mobile terminal or receiving apparatus according to the maximization criterion of the weighted ergodic sum-rate, solving a weighted ergodic sum-rate maximization problem is converted into iterative solving of a quadratic optimization problem through majorize-minimization (MM) algorithm.

10. The method for massive MIMO robust precoding transmission under imperfect CSI according to claim 9, wherein expectations of matrices required by solving the quadratic optimization problem are fast calculated by using deterministic equivalents.

11. A method for channel acquisition with pilot reuse for massive MIMO robust precoding transmission under imperfect CSI, comprising:

a base station (BS) or transmitting apparatus, acquires a posteriori statistical channel models of the mobile terminals or receiving apparatuses, wherein the a posteriori statistical channel model includes channel mean or expected value and channel variance information of an original channel; and the BS or transmitting apparatus performs robust precoding transmission by using the a posteriori statistical channel model including the channel mean or expected value and the channel variance information; in the robust precoding transmission, a downlink acquires channel information with pilot reuse in a precoding domain: the BS or transmitting apparatus transmits a downlink pilot signal to each mobile terminal or receiving apparatus in the precoding domain, the mobile terminal or receiving apparatus performs channel estimation of an equivalent channel in the precoding domain by using the received downlink pilot signal, and the equivalent channel in the precoding domain is the original channel multiplied by a robust precoding matrix wherein in the robust precoding transmission, the BS or transmitting apparatus performs linear precoding matrix design of each mobile terminal or receiving apparatus according to a maximization criterion of a weighted ergodic sum-rate, wherein the weighted ergodic sum-rate is a conditional mean of a weighted sum-rate calculated according to the a posteriori statistical channel model.

12. The method for channel acquisition with pilot reuse for massive MIMO robust precoding transmission under imperfect CSI according to claim 11, wherein the downlink pilot signal transmitted by the BS or the transmitting apparatus to each mobile terminal or receiving apparatus is transmitted on a same time-frequency resource, and the downlink pilot signal of each mobile terminal or receiving apparatus is not required to be orthogonal.

13. The method for channel acquisition with pilot reuse for massive MIMO robust precoding transmission under imperfect CSI according to claim 11, wherein the downlink pilot signal in the precoding domain transmitted by the BS or transmitting apparatus to each mobile terminal or receiving apparatus is a frequency domain signal generated by modulating a Zadoff-Chu (ZC) sequence or a group of ZC sequences.

\* \* \* \* \*